Patented Nov. 23, 1948

2,454,748

UNITED STATES PATENT OFFICE 2,454,748

ASCORBIC ACID TETRAESTER PREPARATION

David I. Weisblat and Donald R. Myers, Kalamazoo, Mich., assignors to The Upjohn Company, Kalamazoo, Mich., a corporation of Michigan No Drawing. Application August 2, 1945, Serial No. 608,602

1 Claim. (Cl. 260—344.5)

This invention relates to processes for the preparation of esters and is more particularly concerned with an improved process for the preparation of esters of laevo ascorbic acid.

The esterification of one or more of the four active hydroxyl radicals in the ascorbic acid molecule will increase the oil solubility of the resulting product and the more highly esterified the product, the greater its solubility in oils. Investigations in the preparation of esterified derivatives of ascorbic acid have been pursued diligently because such derivatives of vitamin C can be combined with other oil-soluble vitamins in a single preparation. Certain of the oil-soluble derivatives of vitamin C also possess improved stability to oxidation.

Esterified derivatives of laevo ascorbic acid have been prepared by a method disclosed in Patent 2,150,140 and German Patent 701,561. This procedure comprises the treatment of metallic salts of ascorbic acid with appropriate acid chlorides at temperature of 80 degrees to 90 degrees centigrade. The preparation of the intermediate metallic salts, however, complicates this procedure. Likewise, the more oil-soluble derivatives of ascorbic acid are prepared by esterification of ascorbic acid with higher homologs of organic mono-carboxylic acids which possess high melting points, requiring that the reaction be carried out at sustained, elevated temperatures above said melting points. Decomposition of such esters occurs to a great extent at these temperatures with loss of the desired reaction product.

It is accordingly a primary object of our invention to provide an improved method for the preparation of oil-soluble esters of ascorbic acid which will lead directly to the formation of the desired ester in a high state of purity.

A further object of our invention is to provide a way to conduct such ester formation under controlled temperature conditions in an inert solvent which will serve to absorb the heat of the reaction, whereby the desired reaction product may be obtained in high yield, free of decomposition products.

Another object of our invention is to provide an acylation catalyst, the use of which is novel in this type of reaction and which will lead to rapid formation of the desired ester in a substantially pure state.

We have simplified the procedure, increased the yield of ester, and isolated the product in a substantially pure state by a new process which comprises the esterification of laevo ascorbic acid or partially acylated derivatives thereof with the anhydride of an organic mono-carboxylic acid in the presence of zinc chloride as an acylation catalyst, the heat of reaction being absorbed by an inert solvent. The temperature of the reaction mixture at no time rises above the boiling point of the inert solvent and decomposition is prevented. The solvent used may be any organic liquid which is incapable of reacting with either the catalyst or the acid anhydride and which has a boiling point below the temperature at which decomposition of the product will occur; for example, ether, boiling at 34.5 degrees centigrade; diisopropylether, boiling at 67.5 degrees centigrade, or dioxane, boiling at 101.5 degrees centigrade. The solvents mentioned have the advantage of dissolving the catalyst, the acid anhydride and in certain cases the ascorbic acid derivative to be acylated. In special cases the solvent may be so chosen that the reactants are soluble and the desired product separates from the reaction mixture. For example, in the practice of our invention with diethyl ether as the solvent in making tribenzoylascorbate, the ester crystallizes from the reaction mixture. Other solvents or mixtures of solvents may be used, and, if desired, when the acid anhydride employed is either a liquid or a solid of sufficiently low melting point, the solvent may be omitted.

The ratio of catalyst to ascorbic acid or ascorbic acid derivative may be varied within wide limits without departing from the scope of this invention.

Among the anhydrides which will react in this manner are, in the aliphatic series, any member with from two carbon atoms, such as acetic anhydride, up to the long-chain aliphatic hydrocarbons, such as lauric anhydride.

The following examples illustrate the practice of our invention, but are not to be considered as limiting the invention:

Parts given are parts by weight unless otherwise indicated.

Example 1

Eleven and five-tenths (11.5) parts (3 moles) of lauric anhydride was mixed with three and six-tenths parts of fused zinc chloride in a solid state. Three and six-tenths (3.6) parts, (1 mole) of ascorbyl-mono-laurate was added thereto and the solids mixed by fusion, the reaction proceeding to completion under the action of the zinc chloride in the fused mass. At the end of the reaction period, the mass was extracted with ether, the desired reaction product being soluble therein, and the residue insoluble. After filtration, three and five-tenths (3.5) parts, fifty per cent, of crude product, melting at 83 degrees to 85 degrees centigrade, was isolated. On recrystallization from petroleum ether, 2.5 parts, thirty-five per cent of pure product was obtained, without working up the mother liquor, melting at 89 degrees to 90 degrees centigrade. This was analyzed for carbon and hydrogen. We found 69.79 per cent carbon and 10.15 per cent hydrogen present, corresponding substantially to the theoretical values of 69.77 per cent and 10.32 per cent, respectively, for the trilaurate of ascorbic acid, $C_{42}H_{74}O_9$. Specific rotation to the D line of sodium at 24 degrees centigrade was $-14.4$ degrees with a concentration of 3.28 grams of the product in 100 milliliters of chloroform.

*Example 2*

Two and four-hundredths (2.04) parts (2 moles) of acetic anhydride was allowed to react with 3.6 parts (1 mole) of ascorbyl-mono-laurate dissolved in ether, in the presence of about two and one-tenth parts of zinc chloride, the reaction being allowed to proceed at 35 degrees centigrade in substantially the same manner as that outlined in Example 1. An oily product was formed which was identified as diacetyl-mono-lauroyl-ascorbic acid.

*Example 3*

One and nine-tenths (1.90) parts (1.5 moles) of acetic anhydride was dissolved in anhydrous isopropyl ether and eleven parts of fused zinc chloride added. Eleven (11.0) parts (1.0 mole) of 3.5.6-tripalmitoyl ascorbic acid was added thereto in a rocking stoppered flask maintained at room temperature. The product formed was isolated and identified as the tetra ester, monoacetyl-tripalmitoyl ascorbic acid.

We claim:

The method for the production of monoacetyl tripalmitoyl ascorbic acid which includes the step of reacting tripalmitoyl ascorbic acid with acetic anhydride in a substantially anhydrous non-reactive organic medium, in the presence of zinc chloride, and separating monoacetyl tripalmitoyl ascorbic acid from the reaction product.

DAVID I. WEISBLAT.
DONALD R. MYERS.

REFERENCES CITED

The following references are of record in the file of this patent:

UNITED STATES PATENTS

| Number | Name | Date |
| --- | --- | --- |
| 1,478,498 | Wilkie | Dec. 25, 1923 |
| 2,150,140 | Warnat | June 6, 1944 |

FOREIGN PATENTS

| Number | Country | Date |
| --- | --- | --- |
| 639,776 | Germany | Dec. 12, 1936 |

OTHER REFERENCES

Degering, Outline of Organic Chemistry, 4th ed., revised 1945, page 89.

Weygard, Organic Preparations, 1945, pages 180 and 181.

Vestling et al., Jr. Biot. Chem. V. 152, March 1944, pages 585 and 586.